United States Patent
Ganiaris

[11] 3,775,990
[45] Dec. 4, 1973

[54] ALTERNATING FILTERS FOR ICE WASH WATER IN COFFEE CONCENTRATION

[75] Inventor: Yudkoff Norman Neophytos Ganiaris, Riverdale, N.Y.

[73] Assignee: Struthers Patent Corporation, Huntsville, Tex.

[22] Filed: Sept. 24, 1970

[21] Appl. No.: 75,036

[52] U.S. Cl. ........................... 62/58, 99/71, 99/199
[51] Int. Cl. ............................................. A23f 1/08
[58] Field of Search .................. 62/58; 99/205, 71, 99/199

[56] References Cited
UNITED STATES PATENTS

| | | | |
|---|---|---|---|
| 3,362,178 | 1/1968 | Cottle et al. | 62/58 |
| 2,552,524 | 5/1951 | Cunningham | 62/58 |
| 2,614,134 | 10/1952 | Powers | 62/58 |
| 2,628,485 | 2/1953 | Foulmin, Jr. | 62/58 |
| 2,815,288 | 12/1957 | McKay | 99/205 |
| 2,945,903 | 7/1960 | Findlay | 62/58 |
| 2,977,234 | 3/1961 | Wenzelberger | 99/205 |
| 3,283,522 | 11/1966 | Ganiaris | 62/58 |
| 3,381,302 | 4/1968 | Reimus et al. | 99/205 |
| 3,404,007 | 10/1968 | Muller | 99/71 |
| 3,531,295 | 9/1970 | Ganiaris | 62/58 |

OTHER PUBLICATIONS

Sivetz, Coffee Proc. Tech., 1963, Vol. 2, Avi Pub. Co., Westport, Conn. (pp. 14–17)

*Primary Examiner*—Norman Yudkoff
*Assistant Examiner*—R. T. Foster
*Attorney*—William A. Drucker

[57] ABSTRACT

In the process of concentrating a comestible extract, such as a coffee or tea extract, by partially freezing the extract to grow ice crystals therein and then removing the ice crystals by centrifugation of the ice-extract mixture, the ice crystals separated by the centrifugation are melted, filtered, and used as a wash liquid sprayed over the ice crystals in the centrifugation step.

1 Claim, 1 Drawing Figure

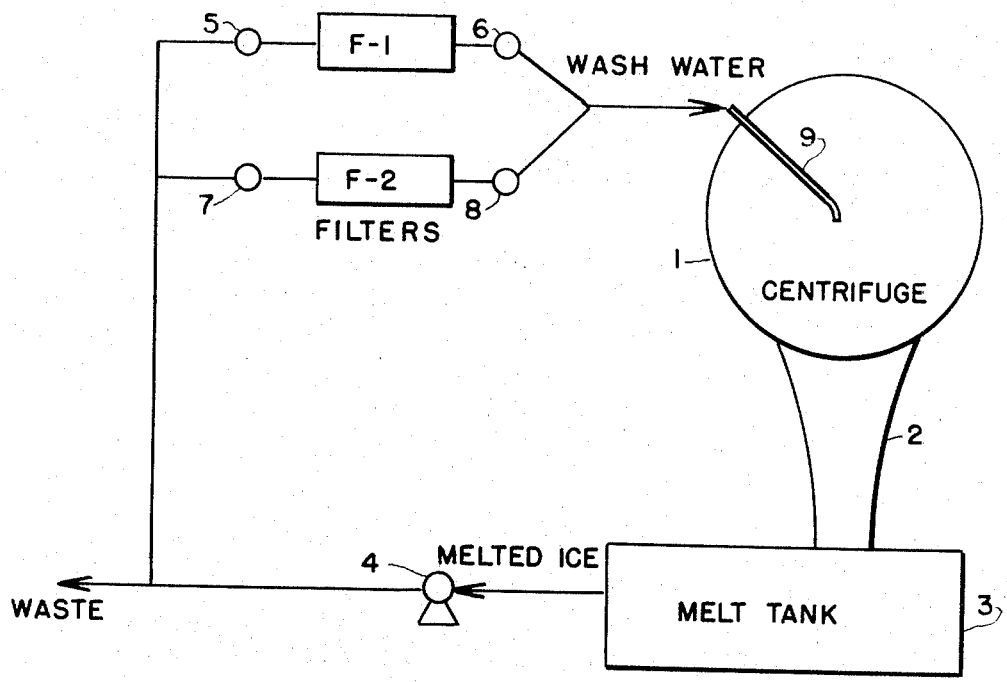

3,775,990

ALTERNATING FILTERS FOR ICE WASH WATER IN COFFEE CONCENTRATION

BACKGROUND OF THE INVENTION

In the processing of comestible liquids, and particularly coffee and tea extracts, such extracts are frequently processed in order to remove water by first partially freezing the extract, followed by centrifugation of the ice-extract mixture. Centrifugation effects removal of the ice formed in the partial freezing operation resulting in a more concentrated extract mother liquor.

In many instances, valuable solids, such as coffee particles and liquid coffee extract, are lost with the ice separated in centrifugation unless they are recovered in some way. Recovery of the valuable solids, such as coffee solids, can be carried out through the spraying of the ice with a wash liquid.

SUMMARY OF THE INVENTION

The present invention makes use of the ice itself which is melted, the coffee solids removed, and the melted liquid then sprayed over the ice separated in the centrifugation operation, thereby resulting in a wash liquid processed in such a way as to recover the aforementioned valuable solids.

The melted ice can be used for washing in the temperature range of about 32°F to about 70°F. In other words, the melted ice can be heated to any desired temperature for processing.

The melted ice liquid must be filtered prior to its ultimate use as a wash liquid since washing is usually carried out through the use of spray nozzles having very small openings in order to provide a fine spray for the actual washing operation. In the case of coffee, for example, the small quantity of suspended coffee solids in the melted ice plugs the spray nozzles after a few hours of operation, thereby requiring the use of a filter to remove the suspended solids from the liquid.

In order to effectively filter solids from the melted ice liquid, a dual filter arrangement outside the centrifuge should be used. When one filter plugs, the flow of melted ice is switched from such filter so as to flow through a second filter. By alternating flow between two filters, the filters may be cleaned periodically, thereby avoiding frequent shutdowns of the centrifuge and, in turn, of the processing plant. At least part of the washing of ice crystals in centrifugation is accomplished by using a wash liquid obtained by at least partially melting ice crystals.

BRIEF DESCRIPTION OF THE DRAWING

The FIGURE of the drawing is a schematic diagram of the process and apparatus of this invention.

DESCRIPTION OF THE PREFERRED EMBODIMENT

Ice crystals grown in a mother liquor of a comestible liquid in a conventional manner are separated from the mother liquor in centrifuge 1. The ice crystals fall down chute 2 into melt tank 3 in which they are melted. Pump 4 passes the melted crystals to either of the filters F-1 or F-2 according to the setting of the valves 5-8. The filter F-1 or F-2, which is not in use, may be removed and cleaned. The melted ice crystals, with included comestible material, pass to the wash water spray 9 in the centrifuge to be sprayed on ice crystals therein as wash water. Ice crystals in melt tank 3 may only be partially melted therein so that adhering coffee solids or the like pass with melted ice to be used as wash water. Unmelted portions of ice crystals would then be removed from melt tank 3. In conventional practice, wash water is drawn off with the concentrated extract from centrifuge 1.

What is claimed is:

1. In the process of concentrating a liquid coffee extract, including the steps of partially freezing the extract to grow ice crystals therein and then removing the ice crystals with a centrifuge from the ice extract mixture, the additional steps of:
    a. at least partially melting ice crystals separated by the centrifuge,
    b. filtering melted ice crystals in alternating filter flow pattern to separate melted ice from remaining crystals and extract solids,
    c. using the melted ice as a wash liquid sprayed over ice crystals in the centrifuge, and
    d. alternating the filter flow pattern from one filter to another when one filter plugs.

* * * * *

UNITED STATES PATENT OFFICE
CERTIFICATE OF CORRECTION

Patent No. 3,775,990      Issue Date December 4, 1973

Inventor(s) Neophytos Ganiaris

It is certified that error appears in the above-identified patent and that said Letters Patent are hereby corrected as shown below:

On Title page under heading of "Inventor" change "Yudkoff Norman Neophytos" to --Neophytos Ganiaris--.

Signed and sealed this 16th day of April 1974.

(SEAL)
Attest:

EDWARD M. FLETCHER, JR.
Attesting Officer

C. MARSHALL DANN
Commissioner of Paten